United States Patent

Burdis

[11] Patent Number: 5,582,634
[45] Date of Patent: Dec. 10, 1996

[54] METHOD AND APPARATUS FOR CLEANING A GAS

[75] Inventor: Vassilis Burdis, Butzbach, Germany

[73] Assignee: ABB Fläkt AB, Stockholm, Sweden

[21] Appl. No.: 403,863

[22] PCT Filed: Jul. 1, 1993

[86] PCT No.: PCT/SE93/00606

§ 371 Date: Mar. 24, 1995

§ 102(e) Date: Mar. 24, 1995

[87] PCT Pub. No.: WO94/07590

PCT Pub. Date: Apr. 14, 1994

[30] Foreign Application Priority Data

Oct. 1, 1992 [SE] Sweden .................................. 9202845

[51] Int. Cl.⁶ .................................................. B01D 3/00
[52] U.S. Cl. ...................... 95/174; 55/228; 55/257.1; 95/182; 95/195; 95/233; 95/234; 96/201
[58] Field of Search .................... 55/228, 257.1, 55/257.7; 95/174, 177, 182, 186, 187, 195, 233, 234; 96/181, 201, 218

[56] References Cited

U.S. PATENT DOCUMENTS 3,929,968 12/1975 Taub .
4,384,875 5/1983 Batteux et al. .............................. 96/201
4,539,190 9/1985 Shinoda et al. .
4,874,591 10/1989 Jeney .
5,352,420 10/1994 Kurzinger et al. ........................ 95/233

FOREIGN PATENT DOCUMENTS 03-93402 10/1990 European Pat. Off. .
3920544 10/1990 Germany .
92/15519 9/1992 WIPO .

Primary Examiner—C. Scott Bushey
Attorney, Agent, or Firm—Birch, Stewart, Kolasch & Birch, LLP

[57] ABSTRACT

A method and an apparatus for cleaning a gas containing pollutants, such as hydrogen chloride and heavy metals, are described. The polluted gas (2) is contacted with an aqueous washing liquid (3) in a scrubber (1), whereupon part of the washing liquid is preevaporated in a preevaporation unit (7) to form a hydrochloric-acid-containing top fraction, which is essentially free from heavy metals, and a bottom fraction containing hydrochloric acid and heavy metals. Part of the bottom fraction is recirculated (15) for renewed preevaporation, while the remainder of the bottom fraction is treated (16) to remove any heavy metals present. The top fraction from the preevaporation is distilled in a rectification unit (22) to form a top fraction (31) and a bottom fraction (35).

12 Claims, 4 Drawing Sheets

METHOD AND APPARATUS FOR CLEANING A GAS

FIELD OF THE INVENTION

The present invention relates to a method and an apparatus for cleaning a gas containing pollutants, such as hydrogen chloride and heavy metals, by contacting the gas with an aqueous washing liquid which takes up the pollutants. More specifically, the invention relates to a method and an apparatus for cleaning flue gases formed during the combustion of waste, such as household refuse, and recovery of the pollutants removed during the cleaning as valuable products, such as hydrochloric acid, solid chlorides, heavy metals in pure form, and/or minimising the volume of the pollutants removed.

DESCRIPTION OF CONVENTIONAL ART

During the combustion of waste, such as industrial waste and household waste (refuse), the flue gases will contain, inter alia, hydrogen chloride, heavy metals and other pollutants. The hydrogen chloride is formed e.g. when the burnt waste contains sodium chloride from food products or chloride-containing plastics, such as polyvinyl chloride. Before the flue gases are emitted into the atmosphere, hydrogen chloride, heavy metals and other pollutants must be removed by washing the flue gases with an aqueous solution in a so-called scrubber or washer, which results in a diluted aqueous solution of hydrochloric acid. In addition to hydrochloric acid, the aqueous solution contains other pollutants from the flue gases, such as heavy metals, i.e. mainly zinc, lead and mercury, inert solids, as well as bromides and fluorides. The hydrochloric acid concentration is about 2–15% by weight depending on, inter alia, the design of the scrubber and the concentration of hydrogen chloride in the flue gases. Here and in the following, the hydrochloric acid concentration is indicated in per cent by weight of HCl, based on the total amount of HCl and water.

It is known to remove the heavy metals from the washing liquid by adding chemicals which with heavy metals form sparingly soluble compounds. One example is the adding of sodium sulphide, whereby the heavy metals are precipitated as heavy metal sulphides. According to today's technique, the heavy metals are not utilised, but the heavy metal sludge produced is a waste product to be disposed of.

Moreover, it is known to remove the absorbed hydrochloric acid from the washing liquid by distillation. Since hydrochloric acid and water form an azeotrope, a hydrochloric acid is obtained during the distillation, having a maximum concentration of about 20% by weight. Instead of removing the hydrochloric acid in the washing liquid by distillation, a prior art measure is the cleaning of the washing liquid in a wastewater treatment plant and the adding of a chloride-forming substance to the washing liquid and evaporate this for recovery of the chloride of the washing liquid as a solid chloride salt. In these contexts, "chloride-forming substance" means substances which form chlorides with chloride ions. More precisely, oxides, hydroxides or carbonates of alkali metals or alkaline earth metals are intended. Among chloride-forming substances preferred, NaOH, $NaCO_3$, CaO, $Ca(OH)_2$ and $CaCO_3$ may be mentioned.

As an example of prior art technique in the field, PCT 92/15519 may be mentioned, which relates to wet treatment of a gas containing hydrogen chloride, the gas being contacted with a washing liquid which contains a chloride-forming substance, such as calcium carbonate. After an optional preevaporation step, the washing liquid is conducted to a distillation unit and distilled, after adding sulphuric acid for recovery of highly concentrated hydrochloric acid.

EP 0 393 402 is a further example of prior art technique, which discloses cleaning of hydrochloric-acid-containing flue gases by absorption in water. The absorption is performed in several steps, the concentration of hydrochloric acid being increased to above 50 g of HCl/l. The thus obtained hydrochloric-acid-containing aqueous solution is distilled to separate the hydrochloric acid. As also appears from EP 0 393 402, it is known to add carbonates or hydroxides of alkali metals or alkaline earth metals to the washing liquid, and then evaporate the washing liquid to recover e.g. sodium chloride or calcium chloride.

Another example of prior art technique is U.S. Pat. No. 4,874,591 which relates to treatment of hydrogen-chloride- and sulphur-dioxide-containing waste gases with a solution containing magnesium ions to remove the hydrogen chloride and the sulphur dioxide in the form of magnesium chloride and magnesium sulphate, respectively. By adding calcium ions, the sulphate is precipitated as calcium sulphate. The magnesium chloride solution is converted by pyrohydrolysis into hydrochloric acid and magnesium oxide which is then converted into magnesium hydroxide and recirculated.

A further example of prior art technique is U.S. Pat. No. 4,539,190 which discloses flue gas treatment by detecting the amount of hydrogen chloride in the flue gas and by adding a corresponding amount of sodium salt solution to convert the hydrogen chloride into sodium chloride, and by adding calcium ions for absorption of sulphur dioxide.

A still further example is U.S. Pat. No. 3,929,968 which relates to a method for dry collection of waste materials in hot gases, the hot gas first being cooled in an evaporative cooler and subsequently supplied to a dry collecting device, such as a bag filter, to remove solid particles. Then the gas is fed into a scrubber for absorption of soluble, acidic or basic components. The solution from the scrubber is the feeding liquid to the evaporative cooler.

One more example of prior art is DE 39 20 544 which discloses the cleaning of flue gases from hydrogen chloride, sulphur dioxide, heavy metals and other pollutants by means of a wet cleaning system. The hydrogen chloride is absorbed and bound as sodium chloride which after evaporation crystallises and is recovered. The sulphur dioxide is absorbed and precipitated as calcium sulphate, and the heavy metals are precipitated as e.g. sulphides.

Despite the technique thus known, there is a need for a method for cleaning a gas, preferably flue gas, which contains pollutants, such as hydrogen chloride and heavy metals, the pollutants being efficiently removed while the amount of waste products is minimised, said method permitting recovery of the hydrogen chloride as high-quality hydrochloric acid or as chloride salt, and also recovery of the heavy metals in pure form. The cleaning method and the apparatus used therefor should further be flexible and cost-effective to operate and constructed in such a way that the energy consumption is optimised.

SUMMARY OF THE INVENTION

The present invention aims at achieving one or more of the above-mentioned objects.

One object of the invention thus is to recover from flue gases high-quality hydrochloric acid.

A further object is to recover from flue gases heavy metals, such as zinc, lead and mercury, in pure form.

Another object is to recover from flue gases polluting hydrogen chloride as solid chlorides, such as sodium chloride.

A still further object is to recover hydrochloric acid having a superazeotropic concentration.

Another further object is to provide an economical and flexible apparatus, by means of which one or more of the objects above can be achieved.

The invention provides a method for cleaning a gas containing pollutants, such as hydrogen chloride and heavy metals, by contacting the gas with an aqueous washing liquid which takes up the pollutants, characterised by a) preevaporating a washing liquid with absorbed pollutants, thereby forming a hydrochloric-acid-containing top fraction which is essentially free from heavy metals, and a bottom fraction which contains hydrochloric acid, heavy metals and inert material, b) recirculating part of the bottom fraction, for renewed evaporation, while the remainder of the bottom fraction is treated to remove heavy metals, and c) distilling the top fraction from the preevaporation step, thereby forming a top fraction and a bottom fraction.

The invention also provides an apparatus for cleaning a gas containing pollutants, such as hydrogen chloride and heavy metals, characterised by a scrubber having inlets for polluted gas and for a washing liquid, and outlets for cleaned gas and for a hydrochloric-acid-containing washing liquid, a preevaporation unit having an inlet for the hydrochloric-acid-containing washing liquid, an outlet for a hydrochloric-acid-containing top fraction and an outlet for a heavy-metal-containing bottom fraction, a heavy metal separation unit having an inlet connected with the bottom fraction outlet of the preevaporation unit, an outlet for separated heavy metals, and an outlet for recirculation of an essentially heavy-metal-free fluid to the scrubber, a distillation unit having inlets for the top fraction from the preevaporation unit and outlets for a top fraction and a bottom fraction.

The further features and advantages of the invention are apparent from the following description and the claims.

BRIEF DESCRIPTION OF THE DRAWINGS

The invention will now be described with reference to the accompanying drawings in which.

DESCRIPTION OF THE PREFERRED EMBODIMENTS

Figure 1:
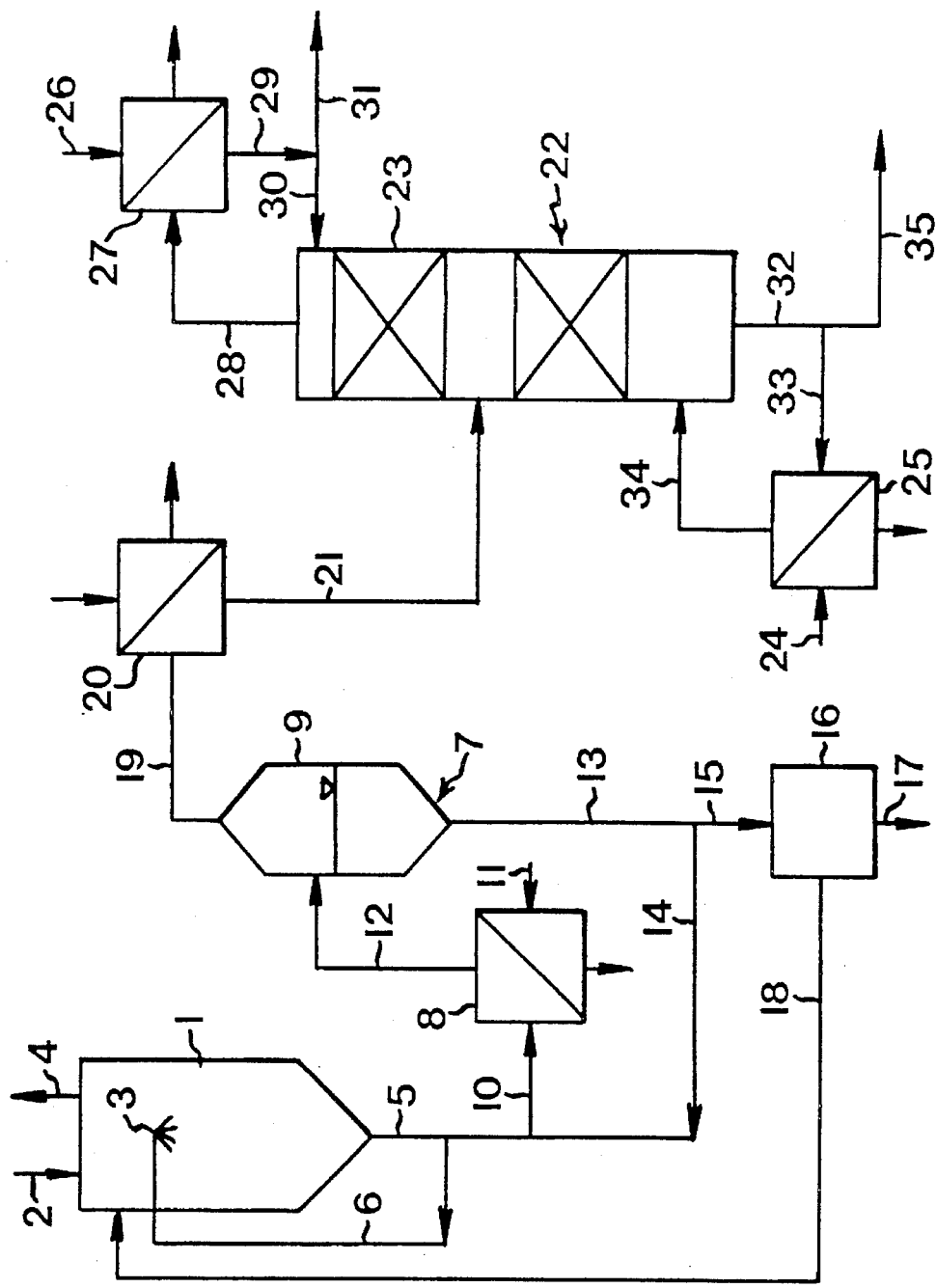
FIG. 1 illustrates an embodiment of an apparatus for carrying out the method according to the invention.

FIG. 1 illustrates a scrubber 1 having an inlet for polluted gas 2. As mentioned above, the polluted gas is preferably a flue gas from the combustion of e.g. industrial waste or household refuse and contains pollutants, such as hydrogen chloride, heavy metals (zinc, lead, mercury etc.), inert particles, nitric oxides, sulphur dioxide etc. In the scrubber, the polluted gas 2 is contacted with a washing liquid 3 which is an aqueous solution. If required, the washing liquid may contain a neutralisation agent, such as an oxide or hydroxide of an alkali metal or alkaline earth metal, to increase the pH of the washing liquid. When the washing liquid is contacted, it takes up the major part of the pollutants from the polluted gas, and the cleaned gas leaves at 4 for further treatment, for example in a $SO_2$ scrubber, before being emitted into the atmosphere.

After cleaning the gas, the washing liquid leaves the scrubber via a conduit 5. From the conduit 5 the major part of the washing liquid is branched off and recirculated to the scrubber via the conduit 6. The remaining part of the washing liquid which, in addition to heavy metals and other minor pollutants, contains about 5–15% by weight of HCl and the balance water, is fed in the conduit 5, optionally via a storage tank (not shown), to a preevaporation unit 7 comprising a heat exchanger 8 and a preevaporator 9. The washing liquid reaches the preevaporation unit 7 via the conduit 10, is heated in the heat exchanger 8 by means of steam 11 and is conducted from the heat exchanger 8 via the conduit 12 to the preevaporator 9. The pressure in the preevaporator 9 suitably is about 0.7–0.9 bar. In the preevaporator 9, the washing liquid is divided into a top fraction in the form of steam, which contains about 5–15% by weight of HCl and the balance water, and a liquid bottom fraction. The bottom fraction leaves the preevaporator 9 via the conduit 13 and is divided into a first partial flow which is recirculated via the conduit 14 to the heat exchanger 8, and a second partial flow which is fed via the conduit 15 to a heavy metal separation unit 16. The second partial flow which is branched off via the conduit 15 is typically about 1–5% of the flow which is supplied in the conduit 5 from the scrubber 1 to the heat exchanger 8 and contains about 15–20% by weight of HCl, about 5–10% by weight of heavy metal cations and inert solids, and the balance (about 0–75% by weight) water.

The heavy metal separation unit may be designed in various ways. In case one merely wants to separate the heavy metal pollutants as a waste product to be disposed of, the heavy metal separation unit may consist of a film evaporation unit from which the heavy metal pollutants are separated as a sludge via the outlet 17. Alternatively, the heavy metal separation unit may be a device for precipitating the heavy metal pollutants by adding e.g. a sulphide compound, such as sodium sulphide, whereupon heavy metal sulphides formed are separated by sedimentation, centrifugation or in some other manner and removed as a sludge via the outlet 17. The fluid (steam or liquid) which is obtained in the separation of the heavy metal pollutants from the bottom fraction and which contains about 20% by weight of HCl and the balance water is branched off from the heavy metal separation unit via a conduit 18 and recirculated to the scrubber 1.

In case one wants to recover and utilise the heavy metal pollutants in the bottom fraction from the preevaporation unit 7, which constitutes a preferred embodiment of the invention, the heavy metal separation unit 16 comprises a device for recovering the heavy metals in pure metallic form via the outlet 17. Such a device preferably consists of an electrolyser for electrolytic precipitation of the heavy metals, or an ion exchanger for separating the heavy metals by ion exchange. The specific conditions for such recovery of heavy metals by electrolysis or ion exchange are per se known or can easily be obtained by the expert by means of simple routine experiments. In this manner, the heavy metals (zinc, lead, mercury) may be recovered in pure form and utilised. It will be appreciated that this brings an advantage compared with the disposal thereof as waste, with the risk of the environment being polluted. Also in this embodiment, the liquid separated from the heavy metals may be subjected to further treatment, for example in a film evaporator, as described above, to separate the remaining pollutants which are removed via another outlet (not shown), whereupon recirculation to the scrubber 1 is effected via the conduit 18.

The top fraction in the form of steam leaves the preevaporator 9 via a conduit 19 and is condensed in a cooler 20 and subsequently supplied as feed via a conduit 21 to a rectification unit 22 which comprises a rectification column 23, a heat exchanger 25 heated with steam 24, and a condenser 27 cooled with water 26. The top fraction from the preevaporation unit, which is fed as inflow to the rectification unit via the conduit 21, mainly contains about 5–15% by weight of HCl and the balance water. The top fraction obtained in the distillation leaves the rectification column via a conduit 28, is condensed in the condenser 27, leaves the condenser via a conduit 29 and is divided into a partial flow which is recirculated to the rectification column via a conduit 30, and a further partial flow which leaves as a product flow via a conduit 31. The product flow in the conduit 31 consists of an aqueous solution free from heavy metals and having a concentration of HCl of up to about 15% by weight, depending on the conditions selected for the distillation in the rectification column 23. If one thus chooses to take out from the column a small amount of a bottom product, which has a high (azeotropic) concentration of hydrochloric acid, a top fraction rich in hydrochloric acid is obtained, and vice versa. When taking out a large amount of the azeotropic bottom product, a top fraction almost free from hydrochloric acid is obtained, which may be used as make-up water for the scrubber 1. When taking out a smaller amount of the azeotropic bottom product, an essentially pure, diluted hydrochloric acid which is free from heavy metals is obtained as the top fraction, having for example a concentration of about 5–15% by weight. This pure hydrochloric acid may be used in different contexts which do not require highly concentrated hydrochloric acid, for example when regenerating an ion exchange system for treating feed water for steam boilers.

A bottom product leaves the rectification column 23 via a conduit 32, a partial flow being recirculated to the rectification column via a conduit 33, the heat exchanger 25 and a conduit 34. The remaining part of the bottom fraction is taken out as a product at 35 and consists of a hydrochloric acid solution, whose concentration of hydrochloric acid depends on the selected distillation conditions stated above. The product flow 35 is typically about 25–45% of the amount of the washing liquid, which is fed from the scrubber to the preevaporation unit 7.

By using the embodiment of the invention as described above, it is possible to clean flue gases from polluting hydrogen chloride and heavy metals and recover the hydrogen chloride as hydrochloric acid having a concentration of up to azeotropic concentration (about 20% by weight). The heavy metals (zinc, lead and mercury) may be recovered in pure form. On the whole, the waste which is to be disposed of will be minimised.

Figure 2:
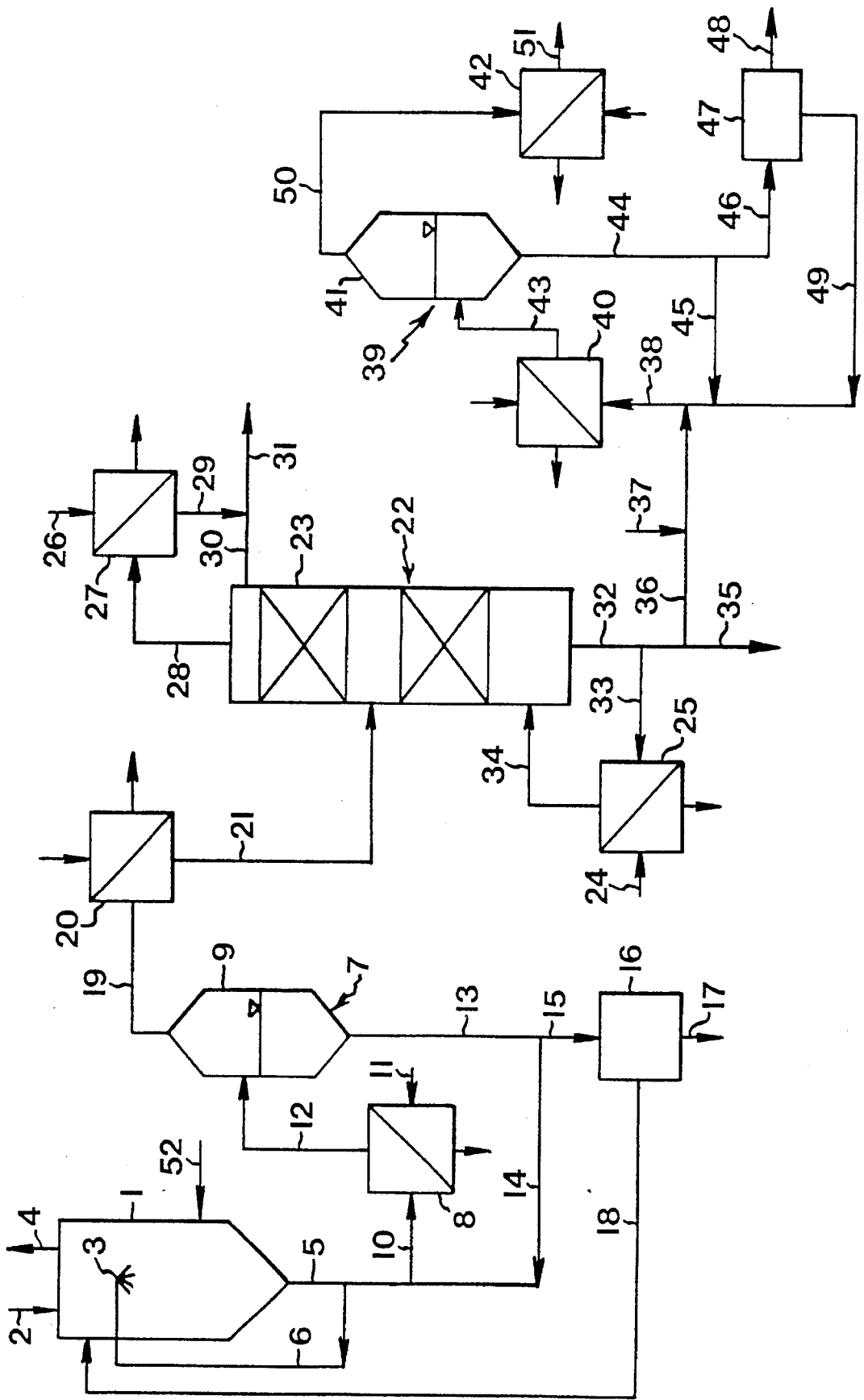
FIG. 2 illustrates a further embodiment of the apparatus according to the invention.

FIG. 2 illustrates a different embodiment of the apparatus according to the invention. This embodiment conforms in many respects with the one in FIG. 1 which has been described above. Corresponding items have therefore been given equal numerals, and for the description of these items, reference is made to the description in connection with FIG. 1.

The main difference between the embodiment in FIG. 1 and the one in FIG. 2 is that in the latter, at least part of the product flow 35 is neutralised with a chloride-forming substance, such as NaOH or $Na_2CO_3$, and is recovered as a solid chloride product. As shown in FIG. 2, part of the product flow of hydrochloric acid is branched off via a conduit 36, and the chloride-forming substance is added to this branched-off hydrochloric acid via a supply station 37. The flow is then fed via a conduit 38 to an evaporation and crystallisation unit 39 which comprises a heat exchanger 40, an evaporator 41 and a condenser 42. The flow supplied in the conduit 38 to the evaporation unit mainly consists of about 25–30% by weight of chloride, such as sodium chloride, and the balance water. After heating in the heat exchanger 40, the chloride-containing supply flow is fed via a conduit 43 to the evaporator 41. A concentrated, chloride-containing bottom product leaves the evaporator via a conduit 44, from which a partial flow is recirculated to the evaporation unit via a conduit 45 and the conduit 38, while the remainder of the bottom fraction is fed via a conduit 46 to a unit 47, such as a centrifuge, for separating solid chloride, preferably sodium chloride, which leaves as a product flow 48, while the effluent which is freed from solid chloride is recirculated via a conduit 49 to the evaporation unit 39.

Via a conduit 50, a top fraction in the form of water vapour leaves the evaporator 41, said water vapour being condensed in the condenser 42 to water which leaves the condenser as a product flow 51. The condensate water from the product flow 51 may be used e.g. as make-up water for the washing liquid in the scrubber 1, as indicated by arrow 52.

By means of the embodiment in FIG. 2 as described above, it is possible in the cleaning of hydrogen-chloride-containing flue gas to recover the hydrogen chloride both as hydrochloric acid and as solid chloride, preferably sodium chloride. Like in the embodiment in FIG. 1, heavy metal pollutants can either be separated for disposal thereof or be recovered in pure form.

Figure 3:
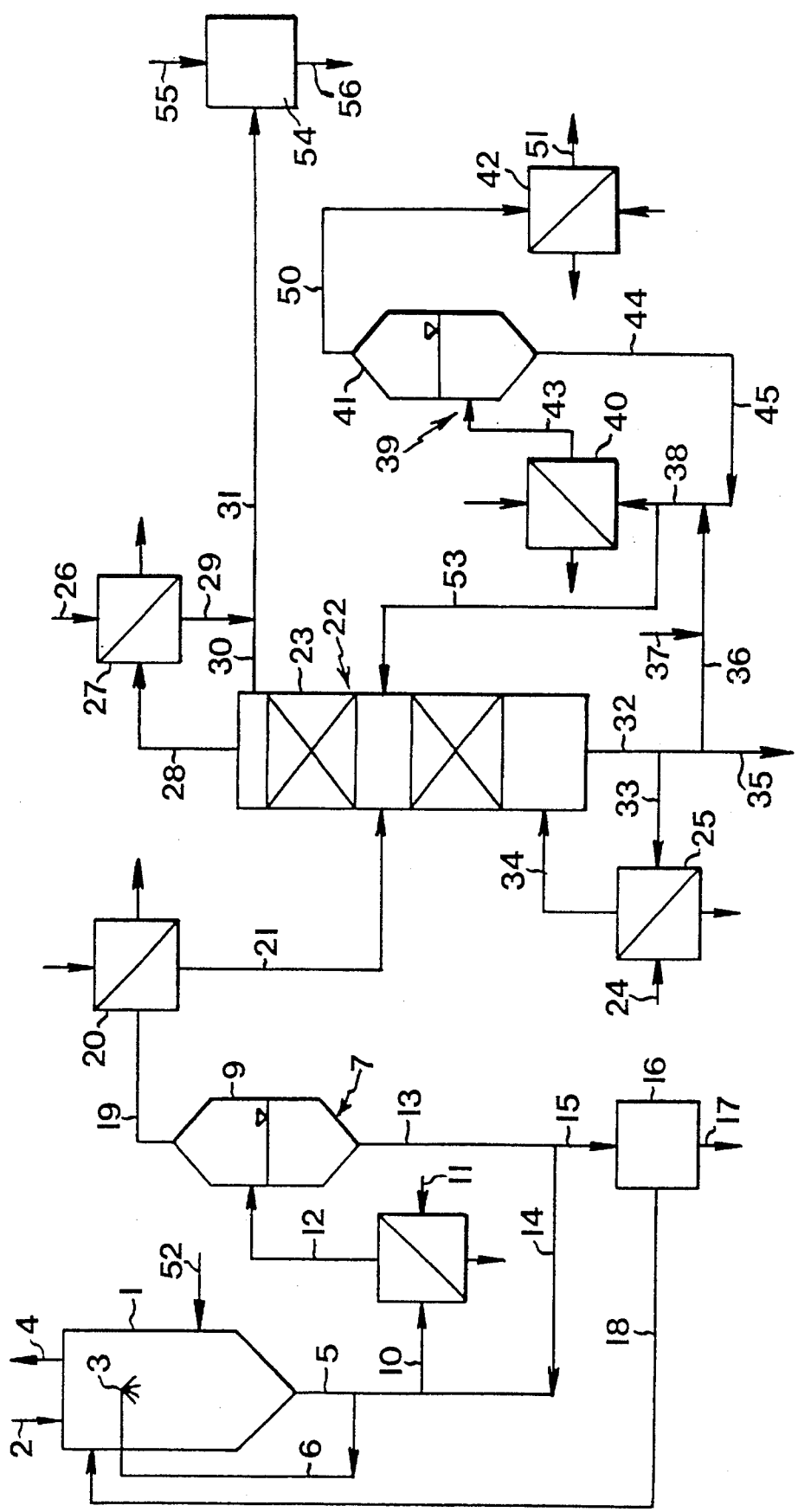
FIG. 3 illustrates another embodiment of the apparatus according to the invention.

FIG. 3 illustrates a further embodiment of an apparatus for carrying out the invention. The apparatus conforms in many respects with those described above in FIGS. 1 and 2, and corresponding items have been given equal numerals. These items are not described here in detail, but reference is made to the description given in connection with FIGS. 1 and 2.

The apparatus in FIG. 3 distinguishes from the one in FIG. 2 by recovering as a top product in the distillation in the rectification column 23 a high-concentration hydrochloric acid, i.e. having a concentration above the azeotropic one. This is achieved by supplying, in addition to the flow of low-concentration hydrochloric acid, in the conduit 21 to the rectification column 23 a flow of calcium chloride. As illustrated in FIG. 3, the bottom product leaves the rectification column 23 via the conduit 32, a partial flow is branched off and recirculated to the column via the conduit 33, while the remainder of the bottom fraction is fed via the conduit 36 to the evaporation unit 39. In this embodiment, preferably no product flow 35 of the bottom fraction is branched off. Adjacent a supply station 37, the bottom fraction flow in the conduit 36 is supplied with an addition of calcium chloride, and the mixture is supplied to the evaporation unit 39 via the conduit 38. The calcium-chloride-containing flow in the conduit 36 mainly contains about 20–40% by weight of calcium chloride and the balance water. Instead of being arranged on the conduit 36, the supply station 37 can be arranged on the conduit 38. The bottom fraction flow and the added calcium chloride is heated in the heat exchanger 40 from which it is conducted to the evaporator 41 in which it is concentrated and leaves as a concentrated flow of calcium chloride via the conduit 44, 45. This flow is recirculated to the evaporation unit 39, a partial flow having a concentration of calcium chloride of about 50–60% by weight being branched off via a conduit 53 and supplied as feed to the rectification column 23. By the simultaneous distillation of this concentrated calcium chloride solution and the hydrochloric acid solution supplied via the conduit 21 a superazeotropic hydrochloric acid is produced as a top fraction from the rectification column 23 and branched off via the conduit 28 to be condensed in the condenser 27. The condensed, highly concentrated hydrochloric acid which is branched off from the condenser via the conduit 29 has a concentration of hydrochloric acid of about 30–95% by weight. Some of this hydrochloric acid solution is recirculated via the conduit 30 to the column 23, while the remainder is fed via the conduit 31 to an absorption and cooling unit 54. In this unit, water is added, at 55, to the highly concentrated acid which leaves as a hydrochloric acid solution product, at 56, having a concentration of hydrochloric acid of about 30% by weight or more.

The evaporation of the calcium-chloride-containing bottom fraction in the evaporator 41 results in a top fraction in the form of steam, which mainly consists of water and which is branched off via the conduit 50 to be condensed in the condenser 42 and branched off therefrom as condensation water 51. As mentioned above in connection with FIG. 2, this condensation water may be used as makeup water in the scrubber 1 (see arrow 52).

To separate superazeotropic hydrochloric acid as the top fraction in the column 23, it is preferred to use calcium chloride in the feed flow 53 to the column, but it is also possible to use sulphuric acid instead of calcium chloride.

By means of the embodiment according to FIG. 3 as described above, it is possible according to the invention to recover from a hydrogen-chloride-containing flow of gas the hydrogen chloride as a highly concentrated (superazeotropic) hydrochloric acid. Any heavy metals present may, like in FIGS. 1 and 2, either be separated, for example as heavy metal sulphides, and disposed of, or be recovered in pure form.

Figure 4:
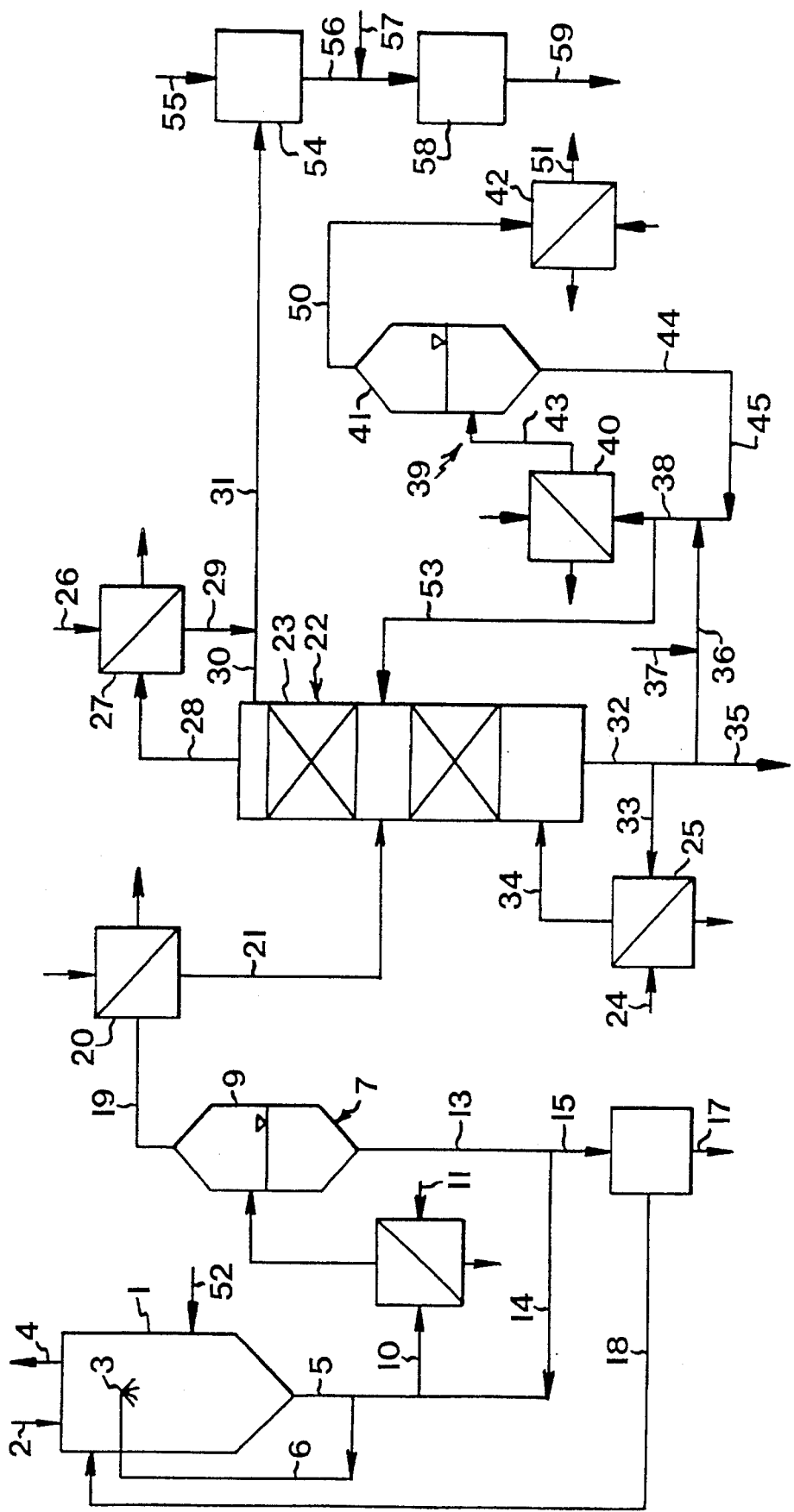
FIG. 4 illustrates a still further embodiment of the apparatus according to the invention.

FIG. 4 illustrates a further embodiment of the apparatus according to the invention. The apparatus conforms in many respects with those described above and illustrated in FIGS. 1–3, and corresponding items have been given equal numerals and will now not be described, but reference is made to the description given above in connection with the respective Figures of these items.

The embodiment according to FIG. 4 distinguishes from that in FIG. 3 by the fact that the highly concentrated hydrochloric acid which is the top fraction from the rectification column is not recovered as an acid but as a solid chloride salt.

Like in the embodiment according to FIG. 3, the top fraction of highly concentrated hydrochloric acid is supplied via the conduit 31 to the absorption and cooling unit 54 in which water is added at 55 to obtain a hydrochloric acid having a concentration of about 50–80% by weight, which leaves via the conduit 56. To this hydrochloric acid a chloride-forming substance, such as NaOH or $Na_2CO_3$, is added via a feed 57 for precipitation of a solid chloride product (sodium chloride). In practice, the feed 57 preferably is a mixing tank. The precipitated chloride product is then separated in a separating unit 58, which preferably is a centrifuge, and subsequently leaves this as a product flow 59 of solid chloride (sodium chloride).

It will be appreciated that modifications of the apparatus and methods according to FIGS. 1–4, as described above, are obvious to and may be made by the man skilled in the art, and such modifications are also comprised by the invention. Thus, it will be appreciated e.g. that the apparatus according to FIG. 4, slightly modified, can be operated as described above in connection with FIGS. 1–3, and the apparatus and method according to FIG. 4 therefore is the most flexible, complete and, consequently, preferred embodiment of the invention.

To further elucidate the invention, some non-restrictive examples follow below.

EXAMPLE 1

Flue gas from a municipal solid waste incineration plant was treated in a wet scrubber system as described above in connection with FIG. 1. From the wet scrubber, a washing liquid flow of about 450 kg/h, containing approximately 7% by weight of HCl and the balance mainly $H_2O$, was diverted to the preevaporator unit. From the preevaporator a bottom product of 22 kg/h was taken out to a settling tank where the settled residue was taken out and treated in a heavy metal separation unit for separating the heavy metals as Hg, Zn and Pb, using conventional technology. The liquid from the settling tank was recycled to the preevaporation unit. The remaining solution after treatment in the heavy metal separation unit, which solution mainly comprised $H_2O$, HCl and inert material, was further treated in a film evaporation unit before being recycled to the scrubber.

The top vapour product from the preevaporation unit amounted to 428 kg/h and contained 6.6% by weight of HCl and 93.3 by weight of $H_2O$. After condensing, this acid was further treated in a rectification unit. However, the acid may be used directly as a product where a very pure acid is not required, e.g. as a pickling acid in the iron and steel industry.

The condensed acid from the preevaporation unit was treated in the rectification unit at a pressure of 0.8 bar and the corresponding temperature. About 142 kg/h of a bottom product containing about 19% by weight of HCl and about 286 kg/h of a top product were produced. The top product was condensed and a liquid of about 99.5% by weight of $H_2O$ was obtained. This product may be used as make-up water in the scrubber.

EXAMPLE 2

An apparatus as described in connection with FIG. 4 was used. The scrubber, the preevaporation unit and the heavy metal separation unit were operated as described in Example 1. However, the $CaCl_2$ solution obtained from the evaporation unit downstream of the rectification unit was circulated to the rectification column and distilled together with the top condensate feed from the preevaporation unit. The distillation was carried out in the rectification unit at a pressure of about 0.7 bar and the corresponding temperature. About 60 kg/h of 45% by weight of HCl was obtained as the top product from the rectification unit. The acid was neutralised, using pure NaOH, and NaCl was crystallised and separated in a centrifuge. The quality of the NaCl product obtained was found to be equal to or even better than that produced by conventional technology.

I claim:

1. Method for cleaning a gas containing pollutants, including hydrogen chloride and heavy metals, by contacting the gas with an aqueous washing liquid which takes up the pollutants, comprising the steps of:

a) preevaporating the washing liquid and the pollutants taken-up, thereby forming a hydrochloric-acid-containing top fraction, which is essentially free from heavy metals, and a bottom fraction containing hydrochloric acid, heavy metals, and inert material, b) recirculating part of the bottom fraction from step a), for renewed preevaporation, while the remainder of the bottom fraction from step a) is treated for removal of heavy metals and recycled to a scrubber, and c) distilling the top fraction from the preevaporation step to form a top fraction and a bottom fraction.

2. Method as claimed in claim 1, wherein the remainder of the bottom fraction in step b) is treated for recovery of heavy metals in pure form.

3. Method as claimed in claim 1, wherein the bottom fraction from step c) contains hydrochloric acid, at least part of the bottom fraction from step c) is supplied with a chloride-forming substance and concentrated by evaporation, and deposited chloride is separated therefrom.

4. Method as claimed in claim 1, wherein a chloride salt is added to the bottom fraction from step c), the chloride-containing bottom fraction is concentrated by evaporation, and at least part of the concentrated, chloride-containing bottom fraction is distilled in step c) together with the top fraction from the preevaporation step to form a top fraction having a concentration of hydrochloric salt which exceeds the azeotropic concentration.

5. Method as claimed in claim 4, wherein the top fraction from step c) contains hydrochloric acid and is supplied with a chloride-forming substance for precipitation and separation of solid chloride.

6. Apparatus for cleaning a gas containing pollutants, including hydrogen chloride and heavy metals, which comprises:

a scrubber having inlets for polluted gas and for a washing liquid, and outlets for cleaned gas and for hydrochloric-acid-containing washing liquid, a preevaporation unit having an inlet for the hydrochloric-acid-containing top fraction, an outlet for a hydrochloric-acid containing top fraction, and an outlet for a bottom fraction containing heavy metals, a recirculation conduit connected with the bottom fraction outlet of the preevaporation unit and with the inlet of the preevaporation unit, a heavy metal separation unit having an inlet connected with the bottom fraction outlet of the preevaporation unit, an outlet for separated heavy metals, and an outlet for recirculation of a fluid, which is essentially free from heavy metals, to the scrubber, a rectification unit having inlets for the top fraction from the preevaporation unit and outlets for a top fraction and a bottom fraction.

7. Apparatus as claimed in claim 6, wherein the outlet for the bottom fraction from the rectification unit is connected with a station for supplying a compound of a chloride-forming substance, and with the inlet of an evaporation unit which has outlets for water and a concentrated bottom fraction, respectively.

8. Apparatus as claimed in claim 7, wherein the outlet for the concentrated bottom fraction from the evaporation unit is connected with a unit for separating solid chloride.

9. Apparatus as claimed in claim 7, wherein the rectification unit has an inlet for the concentrated bottom fraction from the evaporation unit.

10. Apparatus as claimed in claim 9, wherein the top fraction outlet of the rectification unit is connected to a unit for supplying a chloride-forming substance and separating solid chloride.

11. Method as claimed in claim 2, wherein the bottom fraction from step c) contains hydrochloric acid, at least part of the bottom fraction from step c) is supplied with a chloride-forming substance and concentrated by evaporation, and deposited chloride is separated therefrom.

12. The apparatus of cliam 7, wherein the chloride-forming substance is an alkali metal or alkaline earth metal.

* * * * *